United States Patent [19]

Loose et al.

[11] Patent Number: 5,292,178
[45] Date of Patent: Mar. 8, 1994

[54] FRONT SEAT FOR TWO-DOOR VEHICLE

[75] Inventors: Richard D. Loose, Birmingham; Gregory S. Ches, Clinton Township, Macomb County; John De Bano, Shelby Township, Macomb County, all of Mich.

[73] Assignee: General Motors Corporation, Detroit, Mich.

[21] Appl. No.: 914,818

[22] Filed: Jul. 15, 1992

[51] Int. Cl.⁵ .............................................. B60N 2/12
[52] U.S. Cl. .............................. 297/344.1; 297/362.11; 297/337
[58] Field of Search ........ 297/344, 361, 483, 340-342, 297/337; 248/429

[56] References Cited

U.S. PATENT DOCUMENTS

| | | | |
|---|---|---|---|
| 2,653,648 | 9/1953 | Marshall | 297/361 X |
| 2,660,223 | 11/1953 | Appleton | 297/344 X |
| 3,357,740 | 12/1967 | Vaughn et al. | 297/344 X |
| 3,368,845 | 2/1968 | Watanabe | 297/361 X |
| 4,652,053 | 3/1987 | Mikami | 297/483 X |
| 4,759,587 | 7/1988 | Bucka | 297/361 |
| 4,804,226 | 2/1989 | Schmale | 297/216 |
| 4,944,555 | 7/1990 | Brusasco | 297/330 |
| 4,946,223 | 8/1990 | Croft et al. | 297/367 |
| 5,000,283 | 3/1991 | Krieg | 180/271 |
| 5,015,010 | 5/1991 | Homeier et al. | 280/808 |
| 5,020,856 | 6/1991 | George | 297/483 |
| 5,022,677 | 6/1991 | Barbiero | 280/801 |
| 5,044,459 | 9/1991 | Nishikaji | 180/268 |

FOREIGN PATENT DOCUMENTS

| | | | |
|---|---|---|---|
| 0232685 | 8/1987 | European Pat. Off. | 297/361 |
| 0288439 | 10/1988 | European Pat. Off. | 297/344 |
| 2339267 | 2/1975 | Fed. Rep. of Germany | 297/344 |
| 2941185 | 12/1980 | Fed. Rep. of Germany | 297/361 |
| 2126476 | 3/1984 | United Kingdom | 297/361 |

OTHER PUBLICATIONS

Richard F. Johnson et al., Integrating Seat Restraint Systems, Spring 1992, Body Engineering Journal, p. 36 and an unnumbered page.

Primary Examiner—Kenneth J. Dorner
Assistant Examiner—Milton Nelson, Jr.
Attorney, Agent, or Firm—Howard N. Conkey

[57] ABSTRACT

A front seat assembly for mounting to a floor pan of a two-door automobile vehicle and being movable for access to a rear seat. The front seat has a seat bottom. A power operated longitudinal seat adjuster mechanism is carried between and slideably and constantly engageably connects the seat bottom portion to the floor pan for adjustable positioning the seat bottom between a forward position and a rearward position. A power operated reclining mechanism connects a seat back to the seat bottom for positioning and constantly retaining the seat back in positions between a forward tilt position and a rearward reclined position. A three point restraint system is mounted to the seat bottom and the seat back for retaining a front seat occupant. A switch mounted to the seat back of the seat assembly accessible to a rear seat occupant enables simultaneous movement of the seat bottom and the seat back either forwardly or rearwardly.

4 Claims, 4 Drawing Sheets

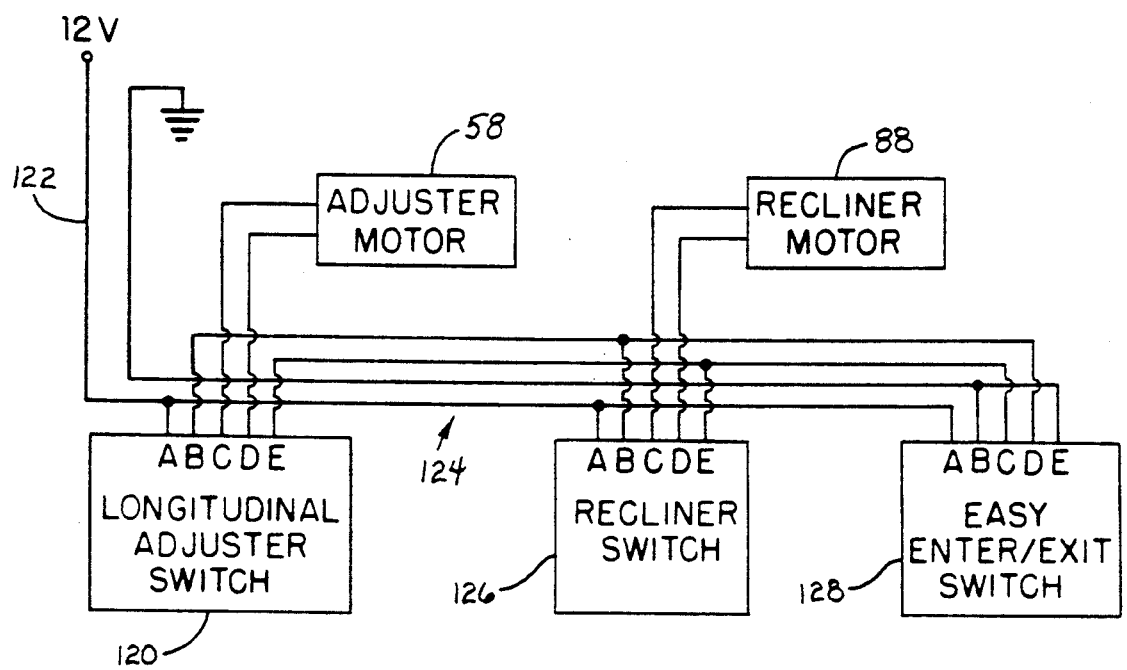
Fig. 5
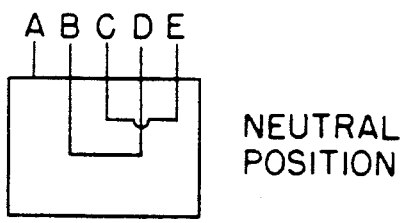
Fig. 6A — NEUTRAL POSITION
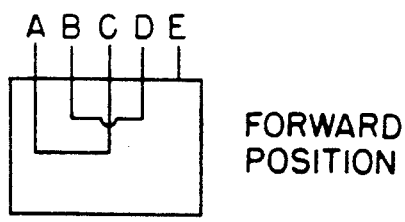
Fig. 6B — FORWARD POSITION
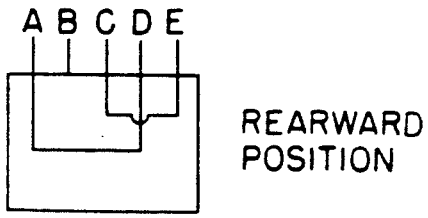
Fig. 6C — REARWARD POSITION

FRONT SEAT FOR TWO-DOOR VEHICLE

BACKGROUND OF THE INVENTION

1. Field of the Invention

This invention relates to an adjustable front seat arranged in a two-door motor vehicle and more particularly to a seat with an integral three point restraint System and constantly engaging recliner and adjuster mechanisms.

2. Description of the Relevant Art

It is known to have a shoulder/lap belt, also called a three point restraint system, attached directly to a front seat of a motor vehicle. Since the seat and the anchor points for the three point restraint move together, the integral belt system allows for more design flexibility. The influence of the restraint system anchors on the design consideration for structures such as pillars, doors and quarter panels is eliminated.

It is also recognized that the loads exerted on the seat belt are transmitted to the vehicle through the seat and, therefore, the seat and associated mechanism must be of sufficient strength to carry the belt loads.

It is also known that the front seat in a two-door motor vehicle must be capable of moving to allow ingress to and egress from the rear seat. One such method is for the seat back of the front seat to tilt forward. A second method combines movement of the seat bottom forward with the tilting forward of the seat back to allow ingress to and egress from the rear seats.

It is also recognized that the seat back must be locked in order for the three point restraint system to work effectively. U.S. Pat. No. 5,000,283 discloses an adjustable front seat for a two-door motor vehicle which has a backrest capable of forward tilting and inclination-adjusting about the same axis. The backrest is locked by a catch pin located on the seat bottom being received by a fork latch. The fork latch is released by the pivoting of a detent pawl which is biased into engagement by a spring. When the detent pawl has not properly engaged the fork latch and the associated door closed and the ignition key inserted, a signal is generated via a switch member. In addition, a backrest-pivoting device activates for pivoting the backrest forwards, while the momentary backrest inclination position is maintained, to pivot the fork latch about the catch pin until the detent pawl falls into the fork latch. The signal is canceled when the detent properly engages into the fork latch. Thus, the U.S. Patent discloses an assembly to signal when the backrest is not engaged and a method to try securing the backrest.

It would be desirable to have a motor vehicle seat for a two-door vehicle, including a three point restraint system integral with the seat, where the seat back is capable of forward tilting and is always engaged, and controls for moving the seat forward for ingress to and egress from the rear seat are accessible to the occupant of the front seat and to the occupant of the rear seat.

SUMMARY OF THE INVENTION

The invention provides an adjustable front seat assembly for a two door automobile vehicle and the front seat being mounted to a floor pan of the vehicle and movable for access to a rear seat. The front seat has a seat bottom. A power operated longitudinal seat adjuster mechanism is carried between and slideably and constantly engageably connects the seat bottom portion to the floor pan for adjustably positioning the seat bottom between a forward position and a rearward position. A power operated reclining mechanism connects a seat back to the seat bottom for positioning and constantly retaining the seat back in positions between a forward tilt position and a rearward reclined position. A three point restraint system is mounted to the seat bottom and the seat back for retaining a front seat occupant. A switch mounted to the seat back of the seat assembly accessible to a rear seat occupant enables simultaneous movement of the seat bottom and the seat back either forwardly or rearwardly.

One object, feature and advantage resides in the provision of a vehicle seat having a three point restraint system and a reclining mechanism that is constantly engaged for transferring the loads of the three point restraint to the vehicle.

Another object, feature and advantage resides in the provision of the vehicle seat where the recliner and the longitudinal adjuster mechanisms are constantly engaged and the control for moving the constantly engaged seat back and seat bottom forward for ingress to and egress from a rear seat is accessible to both the occupant of the front seat and the rear seat.

Further objects, features and advantages of the present invention will become more apparent to those skilled in the art as the nature of the invention is better understood from the accompanying drawings and detailed description.

BRIEF DESCRIPTION OF THE DRAWINGS

FIG. 5 is a schematic of the electrical circuit connecting the adjuster and recliner electric motors to the power source via the switches; and FIGS. 6A, 6B and 6C are schematics of the three positions of the connections between pins of the switches shown in FIG. 5.

DESCRIPTION OF THE PREFERRED EMBODIMENT

Figure 1:
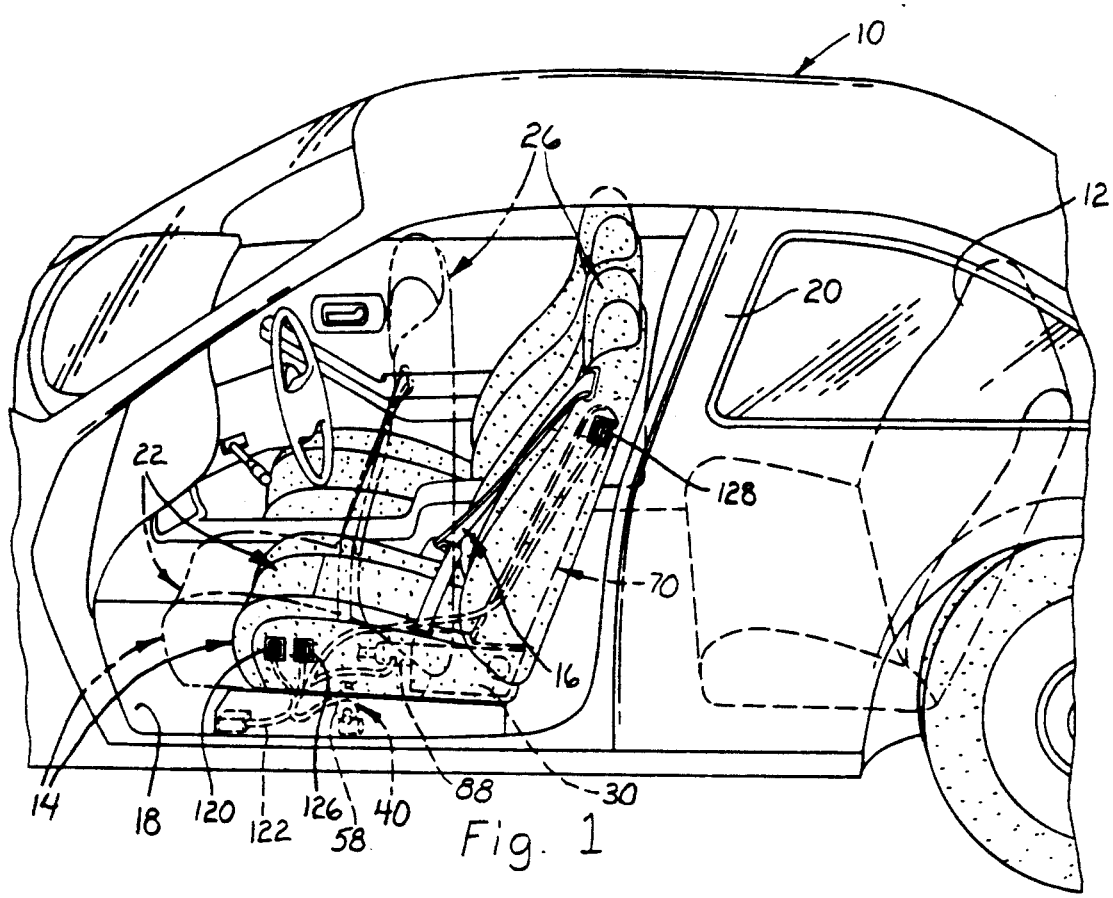
FIG. 1 is a fragment side view of a two-door vehicle. The front seat is shown in the rear seat access position in phantom.

Referring to FIG. 1, a two-door vehicle 10 has a rear seat 12 that is accessible for ingress to and egress from by moving an adjustable front seat assembly 14 from a drive position to a forward rear seat access position, shown in phantom. The front seat 14 has an integral shoulder/lap belt or three point restraint system 16 so that the restraint system 16 is mounted to the front seat 14 as described below and not attached to a floor pan 18 or a pillar 20.

Figure 2:
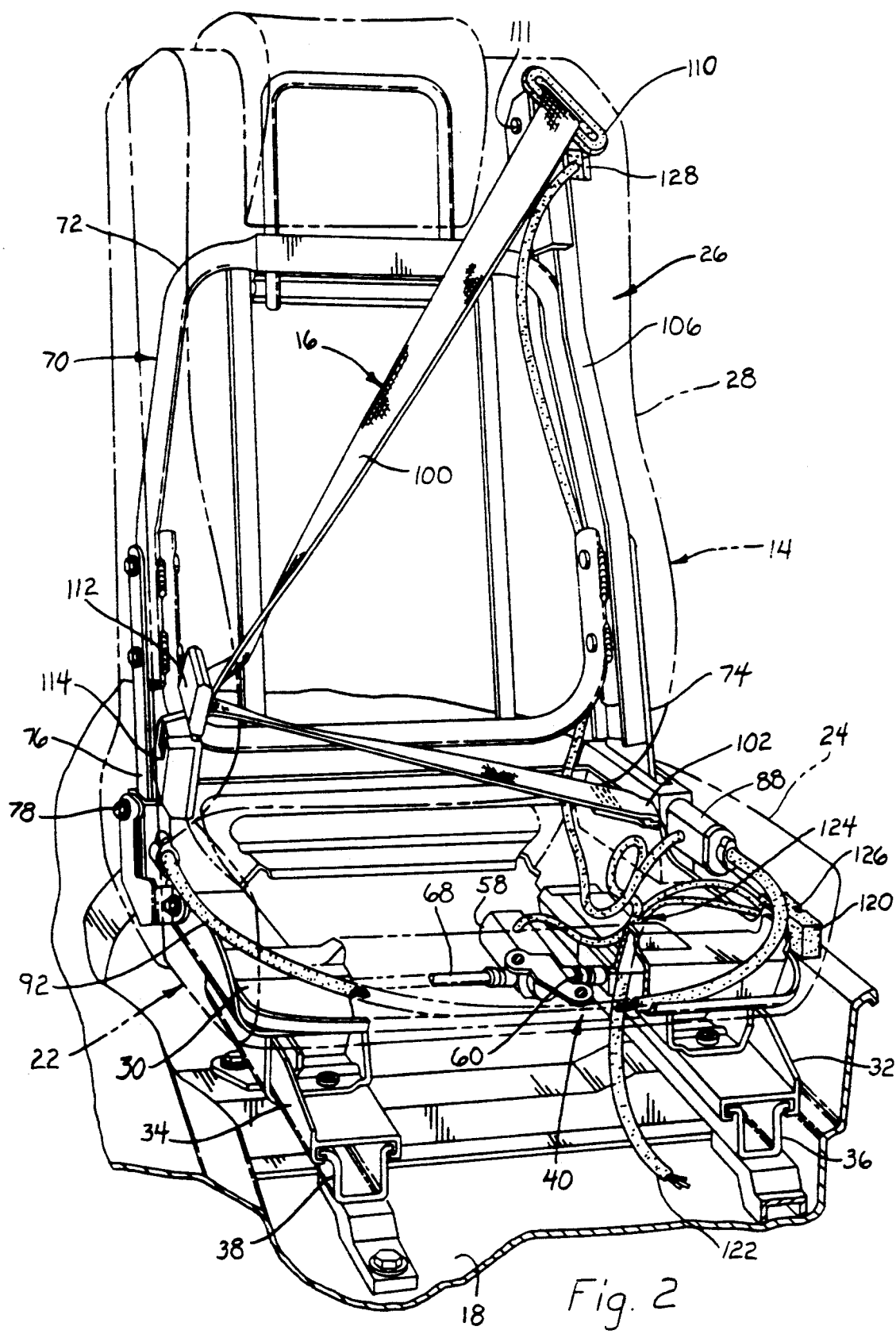
FIG. 2 is a perspective view of the front seat frame with a portion of the seat bottom frame broken away to show a reversible electric adjuster motor. The seat cushion is shown in phantom.
Figure 4:
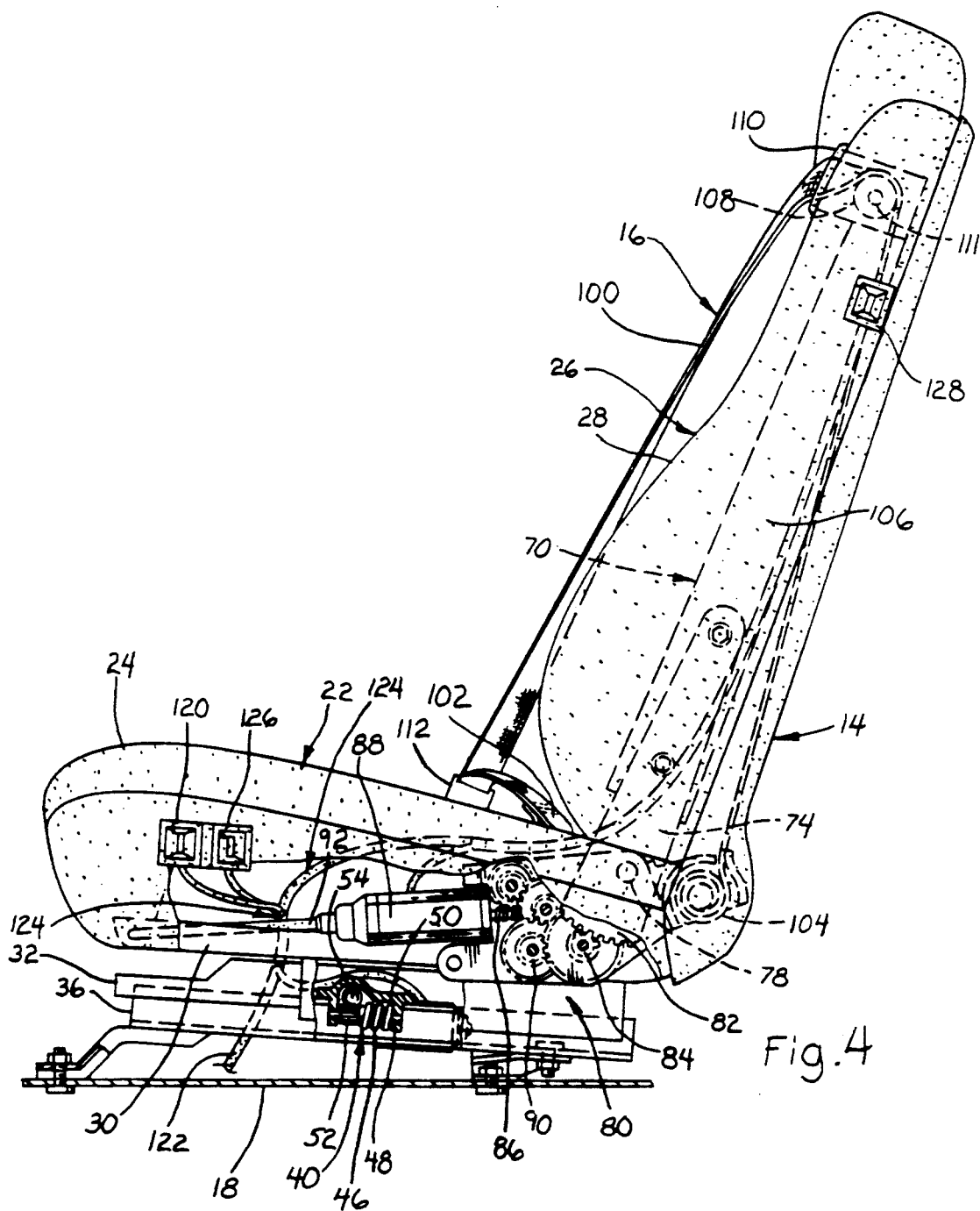
FIG. 4 is a side view of the front seat with the frame shown in hidden line. A portion of the seat bottom cushion is broken away to show the reversible electric motors and rotatable shaft and rack of the longitudinal seat adjuster mechanism.

Referring to FIG. 4, the front seat 14 has a seat bottom 22 including a seat bottom cushion 24 and a seat back 26 pivotally mounted to the seat bottom 22 and including a seat back cushion 28. Referring to FIGS. 2 and 4, a seat bottom frame 30 of the seat bottom 22 is mounted to a pair of longitudinal slide rails 32 and 34. The slide rails 32 and 34 are slideably retained by a pair of guide rails 36 and 38, where the guide rails 36 and 38 are bolted to the floor pan 18 and the movement between the slide and the guide rails 32, 34, 36 and 38 allows the seat 14 to move longitudinally between a forward position and a rear position while not allowing vertical or transverse motion of the seat bottom 22.

Figure 3:
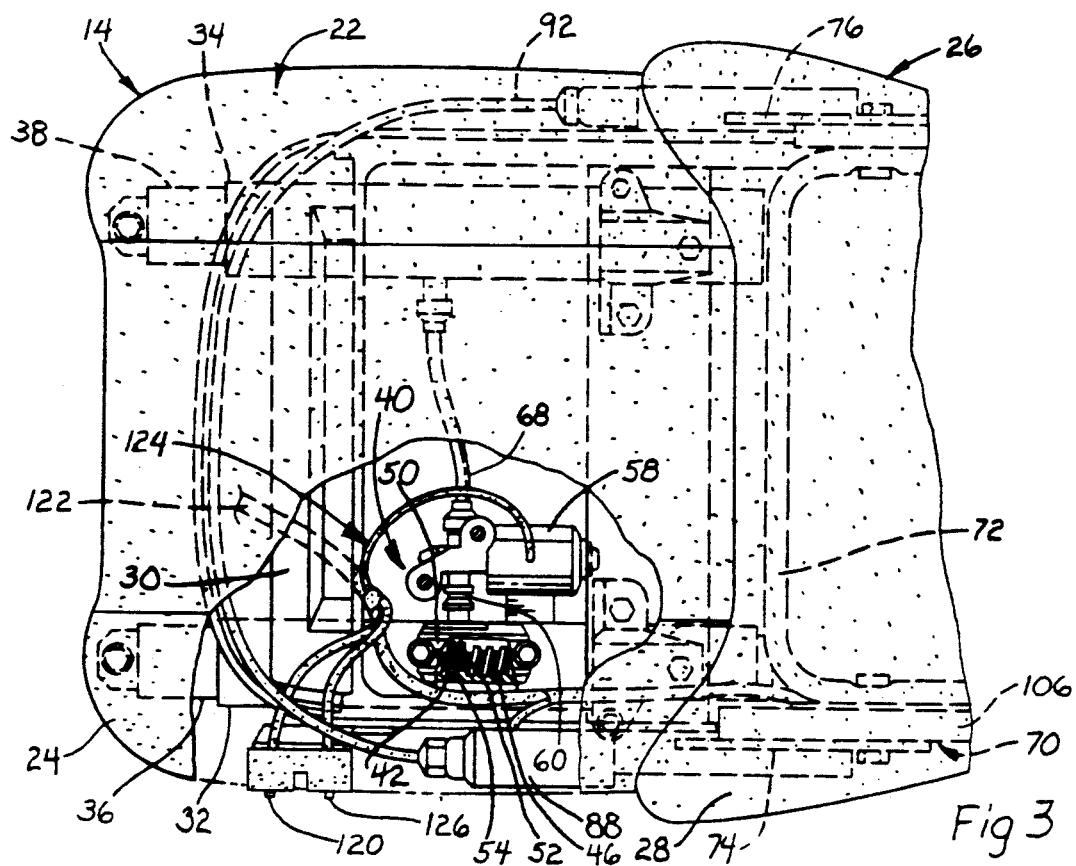
FIG. 3 is a top view of the seat bottom with the frame shown in hidden line. A portion of the seat bottom cushion is broken away to show the reversible electric motors and rotatable shaft and rack of the longitudinal seat adjuster mechanism.

Referring to FIG. 3, a longitudinal seat adjuster mechanism 40 for moving the seat bottom 22 between the forward position and the rear position has a rack 42 including a series of teeth. The rack 42 is secured to the outboard wall of the outboard guide rail 36. The rack 42 is constantly engaged by a screw gear 46 of a rotatable shaft 48 of the longitudinal seat adjuster mechanism 40 as seen in FIGS. 3 and 4. The rotatable shaft 48 is carried by a housing 50 on the outboard slide rail 32. A worm gear 52 of the rotatable shaft 48 is constantly engaged by a worm wheel 54, and a drive shaft of a reversible electric adjuster motor 58 drives the worm wheel 54 via a transmission shaft 60.

Likewise, the inboard guide rail 38 has a rack constantly engaged by a screw gear of a rotatable shaft, and the rotatable shaft is carried by the inboard slide rail 34. Referring to FIG. 4, the drive shaft of the reversible electric adjuster motor 58 drives the screw gear via a transmission shaft 68 so that the screw gears 46 on the slide rails 32 and 34 move concurrently.

The reversible electric adjuster motor 58 rotates the rotatable shafts 48 causing the screw gears 46 to crawl along the racks 42 and thereby move the slide rails 32 and 34 and the seat bottom 22 longitudinally relative to the racks 42 and the guide rails 36 and 38. Referring to FIG. 3, with the screw gears 46 constantly engaging the racks 42, the seat bottom 22 moves only when the gears 46, 52 and 54 and the drive shaft of the adjuster motor rotate; therefore, the friction and the inertia of the longitudinal seat adjuster mechanism 40 prevents the movement of the seat bottom 22 relative to the floor pan 18 unless the motor 58 is powered.

Referring to FIGS. 2 and 3, the seat back 26 has a seat back frame 70 having a tubular frame portion 72 and a pair of recliner frame structures 74 and 76, where the recliner structures 74 and 76 are bolted to the outside of the tubular frame portion 72. Referring FIG. 4, the outboard recliner structure 74 is pivotally mounted to the seat bottom frame 30 by a pivot pin 78. The inboard recliner structure 76 is similarly mounted and both recliner structures 74 and 76 work in unison for pivotable movement of the seat back between a forward tilt position, as in phantom in FIG. 1, and a rear reclined position and through a generally upright driving position of FIG. 1.

Referring to FIG. 4, a recliner mechanism 80, for rotating the seat back 26 between the forward tilt position and the rear reclined position, includes a toothed sector 82 on the outboard recliner structure 74 which is constantly engaged by a primary gear 84 carried by the seat bottom frame 30. The primary gear 84 is driven by a worm gear 86 of a reversible electric recliner motor 88 via a series of intermediate gears 90. Referring to FIG. 2, a transmission cable 92 extends between the reversible electric recliner motor 88 and a second series of gears in which the second series of gears drives a second primary gear that constantly engages a toothed sector of the inboard recliner structure 76.

The reversible electric recliner motor 88 rotates the primary gears 84 causing the toothed sectors 82 of the recliner structures 74 and 76, which constantly engage the primary gears 84, to rotate, thereby rotating the seat back 26 relative to the seat bottom 22 between the forward tilt position and the rear reclined position. Referring to FIG. 4, similar to the adjuster mechanism 40, the friction and the inertia of the recliner mechanism 88 prevents the movement of the seat back 26 relative to the seat bottom 22 unless the motor 88 is powered, since the seat back 26 moves only when the worm gear 86 of the recliner motor 88 and the gears rotate because the primary gears 84 of the recliner mechanism 88 are constantly engaging the toothed sectors 82 of the recliner structures 74 and 76.

Referring to FIGS. 2 and 4, the three point restraint system 16 has a belt 100 that is secured at a first end 102 to the seat bottom frame 30 on the outboard side and secured at the other end to a belt retractor 104 mounted to the seat bottom frame 30. Both ends of the belt 100 are mounted in proximity to the pivot pin 78. A C-shaped channel 106 mounted to the tubular frame portion 72 of the seat back frame 70 on the outboard side extends upward from the recliner structure 74 to a roller 108 and a belt guide loop 110. The belt 100 passes over the roller 108, which is rotatably mounted to the C-shaped channel 106 by an axle 111, whereby the roller 108 eases the movement of the belt 100 from the belt retractor 104 and redirects the belt 100 towards the guide loop 110. The guide loop 110 slideably retains the belt 100 for ensuring the belt 100 maintains contact with the roller 108 and for guiding the belt 100 through the seat back cushion 28. A latch plate 112 slideably receives the belt 100 and is engageable with a buckle 114 carried by the seat bottom frame 30 to define the third point of the three point restraint system 16. The loads exerted on the belt 100 of the three point restraint system 16, also called belt loads, are transmitted through the frames 30 and 70 of the seat 14 to the floor pan 18 of the vehicle 10. For the three point restraint 16 to work optimally and transfer the belt loads to the vehicle 10, the seat 14 should not move as the result of the belt loads; therefore, the recliner mechanism 88 and the adjuster mechanism 40 must maintain the relative position of the seat back 26 to the seat bottom 22 and the seat bottom 22 to the floor pan 18, respectively.

Referring to FIGS. 1, 4 and 5, a longitudinal adjuster switch 120 is located on the outboard Side of the seat bottom cushion 24 to control the longitudinal seat adjuster mechanism 40. The adjuster switch 120 is biased towards a neutral position whereby power is not connected to the motor 58. Referring to FIGS. 5, 6A, 6B and 6C, the adjuster switch 120 can be held in a forward position whereby a circuit is completed so that a 12 volt power source coming through a cable 122 of a wire harness 124 from the vehicle 10 is connected to the reversible electric adjuster motor 58 thereby causing the drive shaft of the motor 58 to rotate the screw gear 46 of the rotatable shaft 48 in one direction to move the seat bottom 22 forward towards the forward position shown in phantom in FIG. 1. The other screw gear, on the inboard slide rail 34, is similarly rotated by the motor 58. Or, the adjuster switch 120 can be held in a rearward position whereby the switch 120 reverses the polarity to the motor 58 and the drive shaft rotates in the other direction to move the seat bottom 22 rearward toward the rear position of FIG. 1. As stated above, the seat bottom 22 is constantly retained in a position relative to the floor pan 18 by the engagement of the racks 42 by the screw gears 46 so that the belt loads are transferred to the floor pan 18 of the vehicle 10 without movement of the seat 14.

Referring to FIGS. 4, 5, 6A, 6B and 6C, a recliner switch 126, located on the outboard side of the seat bottom cushion 24 next to the longitudinal adjuster switch 120, controls the recliner mechanism 80. The recliner switch 126 is biased towards a neutral position whereby power is not connected to the motor 88. The recliner switch 126 can be held in a forward position whereby a circuit is completed so that the 12 volt power source of the vehicle 10 is connected to the reversible electric recliner motor 88 thereby causing the worm gear 86 of the motor 88 to rotate the primary gear 84 clockwise to rotate the seat back 26 forward towards the forward tilt position, shown in phantom in FIG. 1. Likewise, the primary gear on the inboard side of the seat is rotated. Or, the recliner switch 126 can be held in a rearward position so that the switch 126 reverses the polarity to the motor 88 and the primary gear 84 rotates counter-clockwise to rotate the seat back 26 rearward toward the rearward tilt position. As stated above, the seat back 26 is constantly retained in a position relative to the seat bottom 22 by the engagement of the toothed sectors 82 of the recliner structures 74 and 76 by the primary gears 84.

Referring to FIGS. 4 and 5, an easy enter/exit switch 128, located on the upper portion of the seat back cushion 28 on outboard side near the roller 108 of the three point restraint system 16, is connected to the adjuster motor 58 and the recliner motor 88 via the wire harness 124, the adjuster switch 120 and the recliner switch 126. The easy enter/exit switch 128, which is visible when entering the vehicle and easily accessible by the rear occupant, controls both the longitudinal seat adjuster mechanism 40 and the recliner mechanism 80. Referring to FIGS. 5 and 6, the easy enter/exit switch 128 can be held in a forward position where a circuit is completed to both the motors 58 and 88 moving the seat 14 forward towards the rear seat access position with the seat bottom 22 moving towards the forward position and the seat back 26 rotating towards the forward position and the seat back phantom in FIG. 1. Or, the easy enter/exit switch 128 can be held in a rearward position so that the switch reverse the polarity to the motors 58 and 88 and the seat 14 moves towards the drive position with the seat bottom 22 moving towards the rearward position and the seat back 26 rotating towards the neutral driving position.

To get access to the rear seat 12, either the easy enter/exit switch 128 or both the recliner and the adjuster switches 126 and 120 can be moved to the forward position to move the seat to the rear seat access position, with the seat bottom in the forward position and the seat back in the forward tilt position. When it is desired to move the seat to the drive position, either the easy enter/exit switch 128 or both the recliner and the adjuster switches 126 and 120 can be moved to the rear position.

Since both the adjuster mechanism 58 and the recliner mechanism 88 are constantly engaged, the seat 14 can be placed in the desired configuration and the belt loads of the three point restraint system 16 are transferred to the vehicle without the relative movement between the seat back 26, the seat bottom 22 and the floor pan 18.

While an embodiment of the present invention has been explained, various modifications within the spirit and scope of the following claims will be readily apparent to those skilled in the art. For example, it is recognized that a memory could be installed so that when the easy enter/exit switch is placed in the rearward position the seat returns to position that the seat was in prior to movement for access.

The embodiments of the invention in which an exclusive property or privilege is claimed are defined as follows:

1. A front seat assembly for mounting in a two-door vehicle and being movable for access to a rear seat, the front seat assembly comprising:

a seat bottom;

a power operated longitudinal seat adjuster mechanism slideably and constantly engageably connecting the seat bottom to the vehicle for adjustably positioning the seat bottom between a formed position and a rearward position;

a seat back;

a power reclining mechanism connecting the seat back to the seat bottom for positioning and constantly retaining the seat back in positions between a forward tilt position and a rearward reclined position;

a three point restraint system carried by the seat bottom and the seat back for retaining a front seat occupant, wherein loads on the three restraint system are transferred to the seat back and the seat bottom, wherein the loads transferred to the seat back travel through the power reclining mechanism to the seat bottom, and the loads transferred to the seat bottom travel through the power operated longitudinal seat adjuster mechanism to the vehicle; and switch means mounted on the seat back accessible to a rear seat occupant for simultaneously actuating the power operated longitudinal seat adjuster mechanism and the power reclining mechanism to simultaneously move the seat bottom and the seat back either forwardly or rearwardly.

2. A front seat assembly for mounting in a two-door vehicle and being movable for access to a rear seat, the front seat assembly comprising:

a seat bottom having a pair of longitudinal slide rails;

a pair of guide rails mounted to the vehicle and slideably engaging the longitudinal slide rails;

a power operated longitudinal seat adjuster drive mechanism for constantly retaining and slideably engageably positioning the longitudinal slide rails in relation to the guide rails thereby adjustably the seat bottom between a forward position and a rearward position;

a seat back having an inboard recliner frame and an outboard recliner frame;

a power reclining mechanism connecting the inboard and outboard recliner frames of the seat back to the seat bottom for positioning and constantly retaining the seat back in positions between a forward tilt position and a rearward reclined position;

a three point restraint system carried by the seat bottom and the seat back for retaining a front seat occupant, wherein loads on the three point restrain system are transferred to the seat back and the seat bottom, wherein the loads transferred to the seat back travel through the inboard and outboard recliner frames, through the power reclining mechanism to the seat bottom, and the loads on the seat bottom travel through the longitudinal slide rails, through the power operated longitudinal seat adjuster drive mechanism, through the guide rails to the vehicle;

first switch means mounted on the seat bottom accessible to the front seat occupant for actuating the power operated longitudinal seat adjuster drive mechanism to move the seat bottom either forwardly or rearwardly;

second switch means mounted on the seat bottom accessible to the front seat occupant for actuating the power reclining mechanism to rotate the seat back forwardly or rearwardly; and third switch means mounted on the outboard frame of the seat back accessible to a rear seat occupant for simultaneously actuating the power operated longitudinal seat adjuster drive mechanism and the power reclining mechanism to simultaneously move the seat bottom and the seat back either forwardly or rearwardly for access to the rear seat.

3. A front seat assembly for a vehicle being movable for access to a rear seat, the front seat assembly comprising:

a seat bottom;

a power longitudinal seat adjuster mechanism slideably and constantly engageably connecting the seat bottom to the vehicle for adjustably positioning the seat bottom between a forward position and a rearward position;

a seat back;

a power reclining mechanism connecting the seat back to the seat bottom for positioning and constantly retaining the seat back in positions between a forward tilt position and a rearward reclined position;

first switch means mounted on the seat back accessible to a rear seat occupant for simultaneously actuating the power longitudinal seat adjuster mechanism and the power reclining mechanism to simultaneously move the seat bottom and the seat back either forwardly or rearwardly; and second switch means mounted on the seat bottom accessible to a front seat occupant for actuating the power longitudinal seat adjuster mechanism and the power reclining mechanism to independently move the seat bottom and the seat back forwardly or rearwardly.

4. A front seat assembly for mounting in a two-door vehicle and being movable for access to a rear seat, the front seat assembly comprising:

a seat bottom;

a power operated longitudinal seat adjuster mechanism slideably and constantly engageably connecting the seat bottom to the vehicle for adjustably positioning the seat bottom between a forward position and a rearward position;

a seat back;

a power reclining mechanism connecting the seat back to the seat bottom for positioning and constantly retaining the seat back in positions between a forward tilt position and a rearward reclined position;

a three point restraint system carried by the seat bottom and the seat back for retaining a front seat occupant, wherein loads on the three point restraint system are transferred to the seat back and the seat bottom, wherein the loads transferred to the seat back travel through the power reclining mechanism to the seat bottom, and the loads transferred to the seat bottom travel through the power operated longitudinal seat adjuster mechanism, to the vehicle;

first switch means mounted on the seat back accessible to a rear seat occupant for actuating the power operated longitudinal seat adjuster mechanism and the power reclining mechanism to simultaneously move the seat bottom and the seat back either forwardly or rearwardly; and second switch means mounted on the seat bottom accessible to the front seat occupant for actuating the power operated longitudinal seat adjuster mechanism and the power reclining mechanism to independently move the seat bottom and the seat back either forwardly or rearwardly.

* * * * *